(12) United States Patent
Player et al.

(10) Patent No.: US 7,058,090 B1
(45) Date of Patent: Jun. 6, 2006

(54) SYSTEM AND METHOD FOR PARALLELING DIGITAL WRAPPER DATA STREAMS

(75) Inventors: Andrew Mark Player, Salem, NH (US); Alan Michael Sorgi, San Diego, CA (US); George Beshara Bendak, San Diego, CA (US)

(73) Assignee: Applied Micro Circuits Corporation, San Diego, CA (US)

( * ) Notice: Subject to any disclaimer, the term of this patent is extended or adjusted under 35 U.S.C. 154(b) by 1001 days.

(21) Appl. No.: 10/023,675

(22) Filed: Dec. 18, 2001

(51) Int. Cl.
*H04J 3/04* (2006.01)

(52) U.S. Cl. .................. 370/536; 370/537; 370/542

(58) Field of Classification Search ............. 370/356, 370/261, 536, 537, 542, 366
See application file for complete search history.

(56) References Cited

U.S. PATENT DOCUMENTS

| | | | |
|---|---|---|---|
| 6,081,523 A * | 6/2000 | Merchant et al. .......... 370/389 |
| 6,215,798 B1 * | 4/2001 | Carneheim et al. ......... 370/515 |
| 6,768,734 B1 * | 7/2004 | Wenk .......................... 370/366 |
| 6,781,985 B1 * | 8/2004 | Feder et al. ................. 370/376 |
| 2001/0053161 A1 * | 12/2001 | Tomizawa et al. .......... 370/538 |
| 2003/0099238 A1 * | 5/2003 | Payne et al. ................ 370/394 |

* cited by examiner

*Primary Examiner*—Ricky Q. Ngo
*Assistant Examiner*—Richard Chang
(74) *Attorney, Agent, or Firm*—Law Office of Gerald Maliszewski; Gerald Maliszewski

(57) ABSTRACT

A system and method are provided for paralleling data streams in a G.709 network of connected integrated circuits. The system comprises a demultiplexer for receiving a first digital wrapper data stream having a first data rate. The demultiplexer demultiplexes the first data stream into a second plurality of digital wrapper data streams having a second data rate, less than the first data rate. A second plurality of processors each accept a corresponding one of the second plurality of data streams and supply a processed data stream at the second data rate. The demultiplexer receives frame alignment signal bytes in the overhead of every first data stream frame and synchronizes frame alignment signal bytes in each of the second plurality of data streams to the frame alignment signal bytes in the first data stream.

8 Claims, 5 Drawing Sheets

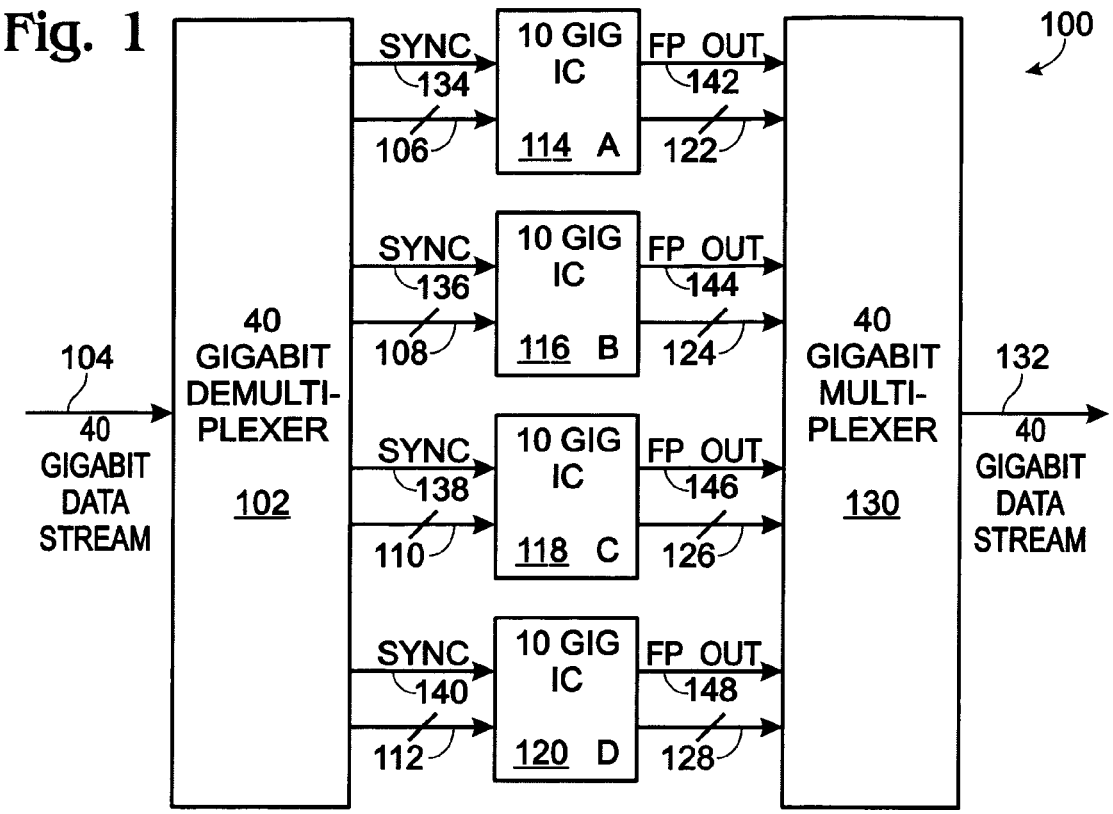
Fig. 1
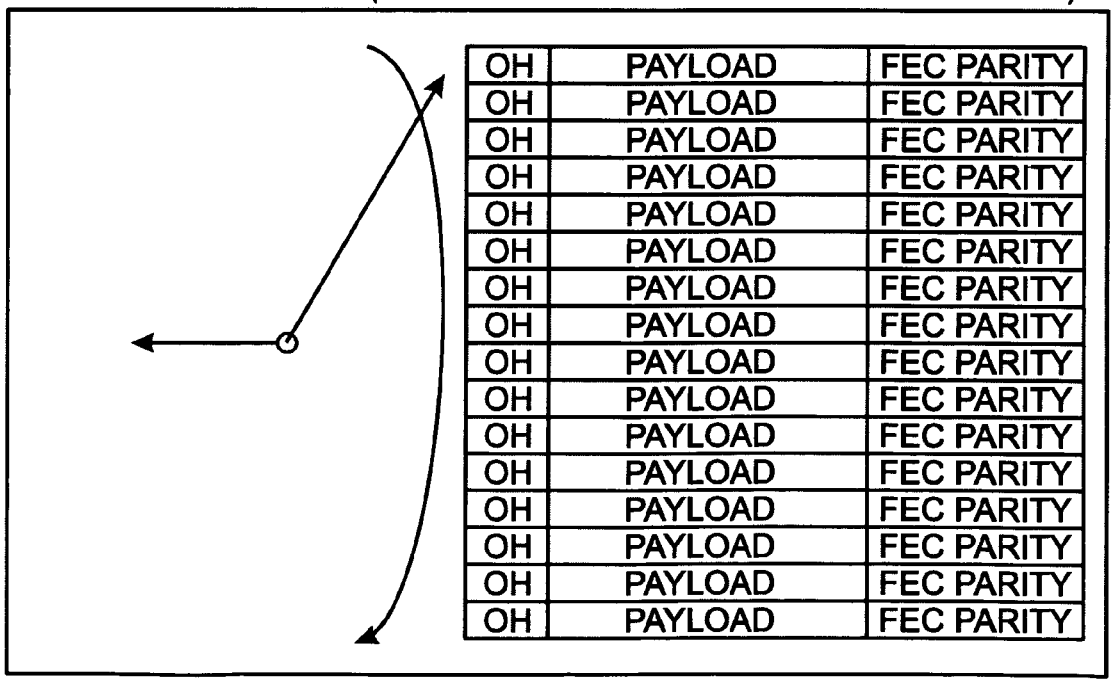
Fig. 2a  OTUk ROW (SHOWN BEFORE INTERLEAVED TRANSMISSION)

Fig. 2b OTUk ROW (SHOWN AFTER INTERLEAVED TRANSMISSION)

| COLUMN | | | | |
|---|---|---|---|---|
| 1 | ... | 16 17 | 3824 3825 ... 4080 | |
| ROW | OH | PAYLOAD | FEC PARITY | |

Fig. 3a

| COLUMN | | | | |
|---|---|---|---|---|
| 1 | ... | 14 15 16 17 | | 3824 |
| ROW 1 | OTUk OVERHEAD | OVERHEAD OPUk | OPUk PAYLOAD (4x 3808 bytes) | |
| 2 | ODUk OVERHEAD | | | |
| 3 | ODUk OVERHEAD | | | |
| 4 | ODUk OVERHEAD | | | |

COLUMN #

| ROW # | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FRAME ALIGNMENT BYTES | | | | | | MFAS | SM | | | GCC0 | | RES | | OPUk OVERHEAD |
| 2 | RES | | | TCM ACT | TCM6 | | TCM5 | | TCM4 | | FTFL | | | |
| 3 | TCM3 | | | TCM2 | | TCM1 | | | PM | | EXP | | | | |
| 4 | GCC1 | | GCC2 | | APS/PCC | | | | | RES | | | | | |

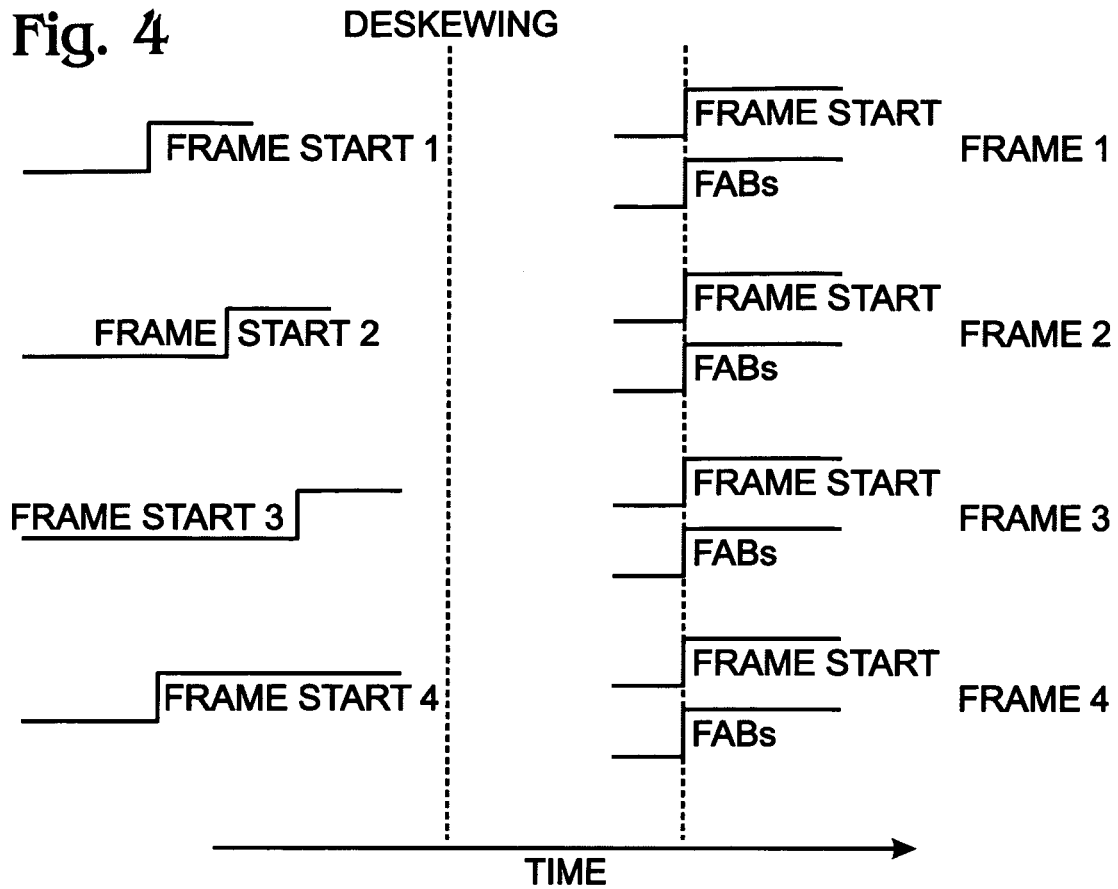
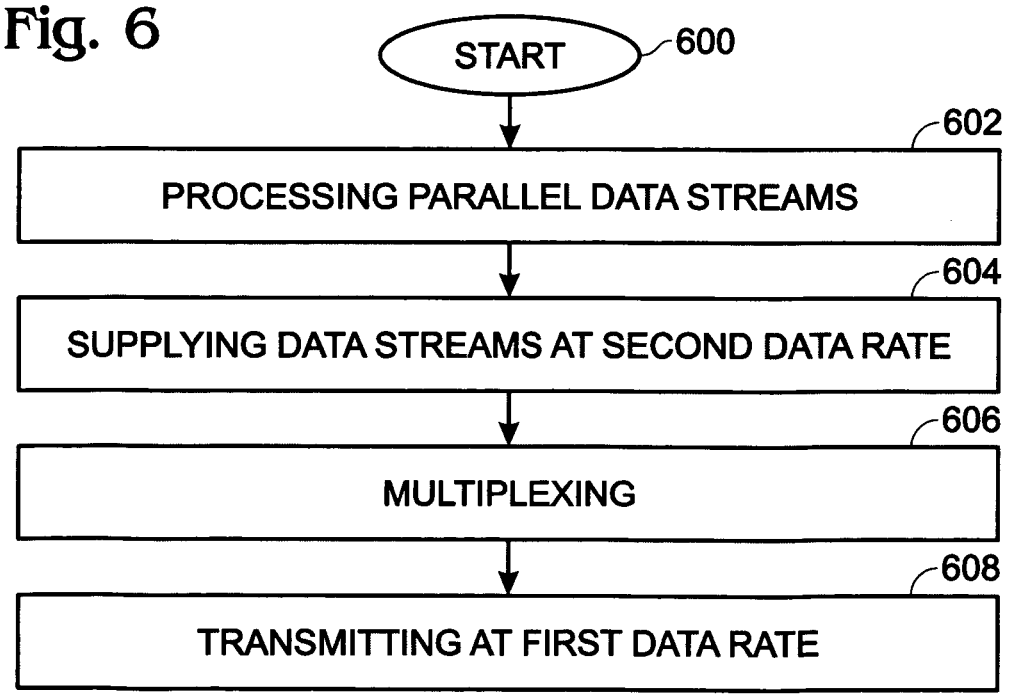

SYSTEM AND METHOD FOR PARALLELING DIGITAL WRAPPER DATA STREAMS

BACKGROUND OF THE INVENTION

1. Field of the Invention

This invention generally relates to digital wrapper format communications and, more particularly, to a system and method for multiplexing and demultiplexing parallel digital wrapper data streams.

2. Description of the Related Art

Digital wrapper format communications, such as those specified in the International Telecommunications Union ITU-T G.709 (G.709) standard, are used for the high-speed transportation of lower hierarchy messages, such as synchronous optical network (SONET) messages. Digital wrapper messages are communicated at a wide variety of data rates. Obviously, it is desirable to communicate information at the highest data rate possible. One key limitation in the digital wrapper data rate is the equipment used to process the messages. Digital wrapper messages are received at nodes, which include processors. The processor performs functions such as decoding the received message, which is typically encoded with forward error correction (FEC). The processor can use the FEC overhead information to make corrections to the received data. The processor can also drop overhead bytes, analyze overhead bytes to determine the health of the network, overwrite the overhead with new overhead bytes, and encode the message with FEC for transmission.

However, the performance of the above-mentioned tasks by the processor can slow the overall data rate between nodes. Then, the data rate of the network must be lowered to accommodate the processors. Alternately, the processors can be designed to be fast enough to accomplish all the required tasks without slowing the overall data rate. However, extremely fast processors are expensive and consume more power to operate. Further, the processor interface devices must be upgraded to keep pace with the faster processors.

It would be advantageous if lower speed processors could be used in the digital wrapper format communication nodes without lowering the overall data rate of the network.

SUMMARY OF THE INVENTION

The invention provides for a chip synchronization feature where a plurality of digital wrapper processors can be paralleled. An example is presented to enable the creation and transport of a 40-gigabit per second (Gbs) data stream in a cost effective manner. This is done by using a synchronization architecture applied to four distinct integrated circuit devices, each of which carries 10-Gbs digital wrapper data.

To continue the example, four 10-Gbs digital wrapper integrated circuit devices can be paralleled to allow processing of a single 40-Gbs data stream. The four 10-Gbs digital wrapper integrated circuit devices each receive a 10-Gbs data stream and an accompanying chip synchronization pulse from a single-40 Gbs demultiplexer device. The demultiplexer device provides a common clock that it fans out to each of the four 10-Gbs digital wrapper integrated circuit devices. Each of the four 10-Gbs digital wrapper integrated circuit devices then aligns its frame boundaries to the incoming chip synchronization pulse, which ensures that the frame boundaries on all four 10-gigabit digital wrapper integrated circuit devices will be synchronized. This enables transport of all four 10-Gbs digital wrapper data streams as a single cohesive 40-Gbs data stream. Each of the four 10-Gbs digital wrapper integrated circuit devices provides a start of frame pulse on its output along with the normal data. Then, a 40-Gbs multiplexer device uses the start of frame pins to align the four 10-Gbs data streams into a single 40-Gbs multiplexed data stream.

Transporting four 10-Gbs digital wrapper data as a single 40-Gbs data stream is advantageous because only the multiplexer and demultiplexer are required to run at the increased data rate, but all the processing of the digital wrapper data can be done with 10-Gbs integrated circuit devices. This results in greatly increased system efficiency with only a minimal increase in cost. Further, by synchronizing the 10-Gbs devices with the means described herein, the multiplexer and demultiplexer devices are made at minimum cost since they will not require much, if any, deskewing functionality.

Accordingly, a system is provided for paralleling data streams in a G.709 network of connected integrated circuits. The system comprises a demultiplexer for receiving a first digital wrapper data stream having a first data rate. The demultiplexer demultiplexes the first data stream into a plurality of digital wrapper data streams having a second data rate, less than the first data rate.

The system also comprises a plurality of processors. Each processor accepts a corresponding one of the plurality of data streams and supplies a processed data stream at the second data rate. A multiplexer receives the plurality of processed data streams and multiplexes the plurality of processed data streams into a first digital wrapper processed data stream having the first data rate for transmission.

The demultiplexer also supplies a synchronization signal with each of the second plurality of data streams, responsive to overhead bytes in the first data stream. More specifically, the demultiplexer receives frame alignment signal bytes in the overhead of every first data stream frame and synchronizes frame alignment signal bytes in each of the plurality of data streams to the frame alignment signal bytes in the first data stream. Each processor processes one of the plurality of data streams in response to receiving its corresponding synchronization signal.

Each processor supplies a frame start signal corresponding to its processed data stream. The multiplexer receives the frame start signals and multiplexes each of the plurality of processed data streams into the first processed data stream in response to the plurality of received frame start signals. More specifically, the multiplexer synchronizes frame alignment signal bytes in the first processed data stream to each of the frame alignment signal bytes in the plurality of processed data streams. In some aspects of the system, the multiplexer phase matches the frame start signals and deskews the plurality of processed data streams to match their corresponding frame start signals.

Additional details of the above-described system, and a method for paralleling data streams in a G.709 network of connected integrated circuits are provided below.

BRIEF DESCRIPTION OF THE DRAWINGS

FIG. 1 is a schematic block diagram of the present invention system for paralleling data streams in a G.709 network of connected integrated circuits.

FIGS. 2a and 2b depict a digital wrapper framing structure.

FIGS. 3a and 3b are diagrams illustrating the G.709 optical data unit (ODU) frame structure, and the ODU overhead, optical channel payload unit (OPU), and optical channel transport unit (OTU) overhead.

FIG. 4 is a depiction of the deskewing function carried out by the multiplexer of FIG. 1.

FIG. 6 is a flowchart illustrating an aspect of the present invention method for paralleling data streams of FIG. 5.

DETAILED DESCRIPTION OF THE PREFERRED EMBODIMENTS

FIG. 1 is a schematic block diagram of the present invention system for paralleling data streams in a G.709 network of connected integrated circuits. The system 100 comprises a demultiplexer 102 with an input on line 104 for receiving a first digital wrapper data stream having a first data rate. As shown, the data rate is approximately 40-gigabits per second (Gbs), however, the system 100 is not limited to any particular data rate. The demultiplexer 102 demultiplexes, or splits the first data stream into a second plurality of digital wrapper data streams having a second data rate, less than the first data rate, supplied at an output on lines 106, 108, 110, and 112. As shown, the second plurality is equal to four, but this is merely exemplary. The present invention is not limited to any particular demultiplexing ratio.

The system 100 further comprises a second plurality of processors. Shown are processors A through D (114, 116, 118, and 120, respectively). Each processor has an input to accept a corresponding one of the second plurality of data streams. That is, processor A (114) has an input on line 106, processor B (116) has an input on line 108, processor C (118) has an input on line 110, and processor D (120) has an input on line 112. Each processor A through D (114–120) has an output to supply a processed data stream at the second data rate. Processor A (114) has an output on line 122, processor B (116) has an output on line 124, processor C (118) has an output on line 126, and processor D (120) has an output on line 128.

The system 100 also comprises a multiplexer 130 having an input to receive the second plurality of processed data streams on lines 122–128. The multiplexer multiplexes, or combines the second plurality of processed data streams into a first digital wrapper processed data stream having the first data rate, supplied at an output on line 132 for transmission.

FIGS. 2a and 2b depict a digital wrapper framing structure. Each frame is composed of a set of rows. As shown, each frame includes four rows. In the notation of the above-described system, each frame comprises a second plurality of rows. Each processor operates on a data stream having a frame structure similar to the frame structures of FIGS. 2a and 2b. Each processor operates on a frame structure having frame alignment signal bytes.

Figure 3B:
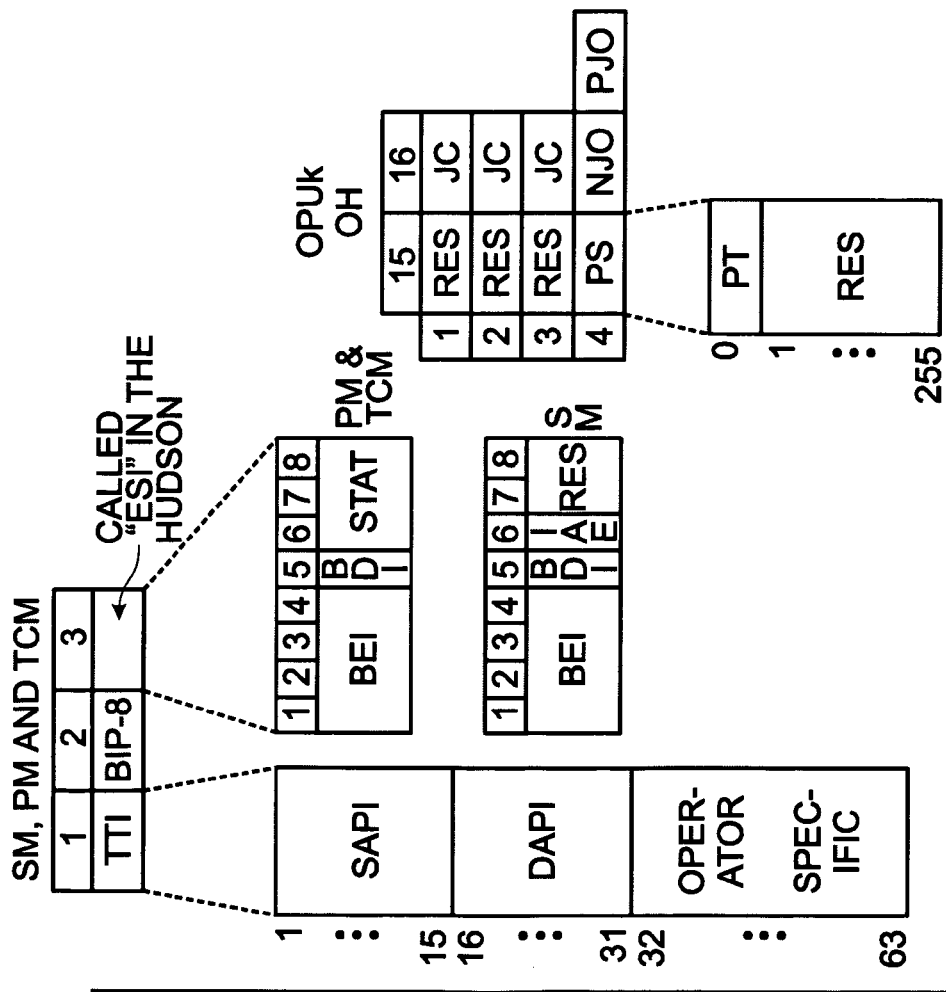

FIGS. 3a and 3b are diagrams illustrating the G.709 optical data unit (ODU) frame structure, and the ODU overhead, optical channel payload unit (OPU), and optical channel transport unit (OTU) overhead. In a G.709 compliant system, it is normal to provide read access to all 64 of the G.709 overhead bytes by dropping them to the user interface during each frame. Some of these 64 overhead bytes contain frame alignment signal (FAS) bytes. As shown, the frame alignment signal bytes are in row 1, columns 1 through 6. The frame alignment signal bytes contain no information per se, but are used as a marker to indicate the beginning of a frame, or a row. That is, the frame alignment signal bytes are used for frame synchronization and timing.

Returning to FIG. 1, the demultiplexer 102 receives first data stream messages in a frame format with overhead bytes, for example the overhead bytes in FIG. 2b, and supplies the second plurality of data stream messages in a frame format with overhead bytes. That is, the demultiplexer 102 demultiplexes the frame into four unique frames corresponding to the four data streams. More specifically, the demultiplexer 102 deinterleaves a unique digital wrapper frame structure that is used for the transport of lower hierarchy OTU frames. This transport frame structure closely resembles a conventional OTU frame. This digital wrapper transport frame is deinterleaved into a second plurality of actual OTU frames that can be processed by conventional processors. For example, the first data stream may be a combination of 4 different OTU2 (10-Gbs) streams interleaved into a 40-Gbs digital wrapper frame that resembles an OTU3 (40-Gbs frame). For every frame received by the demultiplexer 102 in the first data stream, the demultiplexer 102 supplies a first frame on line 106, a second frame on line 108, a third frame on line 110, and a fourth frame on line 112.

It should also be understood that there is a fixed relationship between the first data rate, the second data, and the second plurality of processors. That is, the second data rate is equal to the first data rate divided by the number of processors. Since the first data rate is approximately 40-Gbs and four processors are shown, the data rate on lines 106, 108, 110, and 112 (as well as lines 122, 124, 126, and 128) is approximately 10-Gbs. The exact data rates are stated as approximate, since the rate is affected by a number of different factors in the system and the specific formatting standards in use.

The demultiplexer 102 has an output to supply a synchronization signal on lines 134, 136, 138, and 140 with each of the second plurality of data streams 106, 108, 110, and 112, respectively. The synchronization signals are responsive to overhead bytes in the first data stream on line 104. Each processor has an input to receive a synchronization signal. Each processor processes one of the second plurality of data streams in response to its corresponding synchronization signal. That is, processor A (114) processes the data stream on line 106 in response to the synchronization signal on line 134. Likewise, processor B (116) processes the data stream on line 108 in response to the synchronization signal on line 136, processor C (118) processes the data stream on line 110 in response to the synchronization signal on line 138, and processor D (120) processes the data stream on line 112 in response to the synchronization signal on line 140.

It is possible to provide synchronization timing with respect to a number of different bytes, or byte positions in the frame. One useful synchronization method is for the demultiplexer to send synchronization signals that have a predetermined relationship to the FAS bytes in the first data stream frame and the FAS bytes of each frame in each of the second plurality of data streams.

The demultiplexer 102 synchronizes overhead bytes in each of the second plurality of data streams on lines 106–112 to overhead bytes in the first data stream on line 104. More specifically, the demultiplexer 102 receives frame alignment signal bytes in the overhead of every first data stream frame and synchronizes frame alignment signal bytes in each of the second plurality of data streams to the frame alignment signal bytes in the first data stream. The OTU frame structure of the frames in the second plurality of data streams, with FAS bytes, are explicitly shown in FIG. 3. The digital wrapper frame of the first data stream, although slightly different from a OTU frame, includes FAS bytes. The FAS bytes in the first data stream digital frame structure have a predetermined relationship in the frame structure, although the position need not be identical to the FAS byte positions in the OTU frames.

Likewise, each of the second plurality of processors 114–120 supplies a processed data stream message in a frame format with overhead bytes. As mentioned above in the Background, the processors 114–120 may perform a variety of communication functions, such as dropping and adding overhead bytes, as well as FEC decoding and encoding. The multiplexer 130 transmits the first processed data stream messages on line 132 in a frame format with overhead bytes. Each processor 114–120 has an output to supply a frame start signal on lines 142, 144, 146, and 148, corresponding to processed data streams on lines 122, 124, 126, and 128, respectively. The multiplexer 130 has an input to receive the frame start signals on lines 142 through 148 and multiplexes each of the second plurality of processed data streams on lines 122 through 128 into the first processed data stream on line 132, in response to the second plurality of received frame start signals on lines 142 through 148. The multiplexer 130 synchronizes overhead bytes in the first processed data stream to the overhead bytes in the second plurality of processed data streams using the frame start signals.

More specifically, the second plurality of processors 114–120 supply frame alignment signal bytes in the overhead of every frame (see FIG. 3) in the second plurality of processed data streams on lines 122–128. The multiplexer 130 synchronizes frame alignment signal bytes in the first processed data stream on line 132 to each of the frame alignment signal bytes in the second plurality of processed data streams on lines 122–128. Alternately stated, the synchronization and multiplexing operations are performed using the known position of the FAS bytes in the OTU frames in the second plurality of processed data streams and the FAS bytes in the first processed data stream digital wrapper frame structure. The multiplexer 130 interleaves the frames in the second plurality of processed data streams into a frame in the processed first data stream.

FIG. 4 is a depiction of the deskewing function carried out by the multiplexer 130 of FIG. 1. Due to variations in processor functions, or variations in the clocks operating the processors, or transmission line delays, the second plurality of processed data streams do not necessarily arrive at the multiplexer at the same time. To recombine the second plurality of frames, properly deskewing and synchronization operations must occur. The multiplexer 130 compares each of the second plurality of received frame start signals, and phase matches the frame start signals. The phase matching can occur by delaying the earlier arriving signals to match the later arriving signals. The frame start signals are indicators of the timing of the associated processed data streams. More specifically, the relationship between the frame start signal and the frame alignment signal bytes in the associated processed data stream is known. Once the frame start signals are matched, the same matching operations can be applied to the processed data streams. That is, the second plurality of processed data streams are deskewed to match their corresponding phase matched frame start signals. Once deskewed, the processed data streams are easily multiplexed. Alternately stated, the frame start signals have a predetermined relationship to the FAS bytes of the frames in the second plurality of processed data streams. Once deskewed, the FAS bytes of the frames in the second plurality of processed data streams have a fixed relationship to the FAS bytes in the interleaved frame of the first processed data stream.

Figure 5:
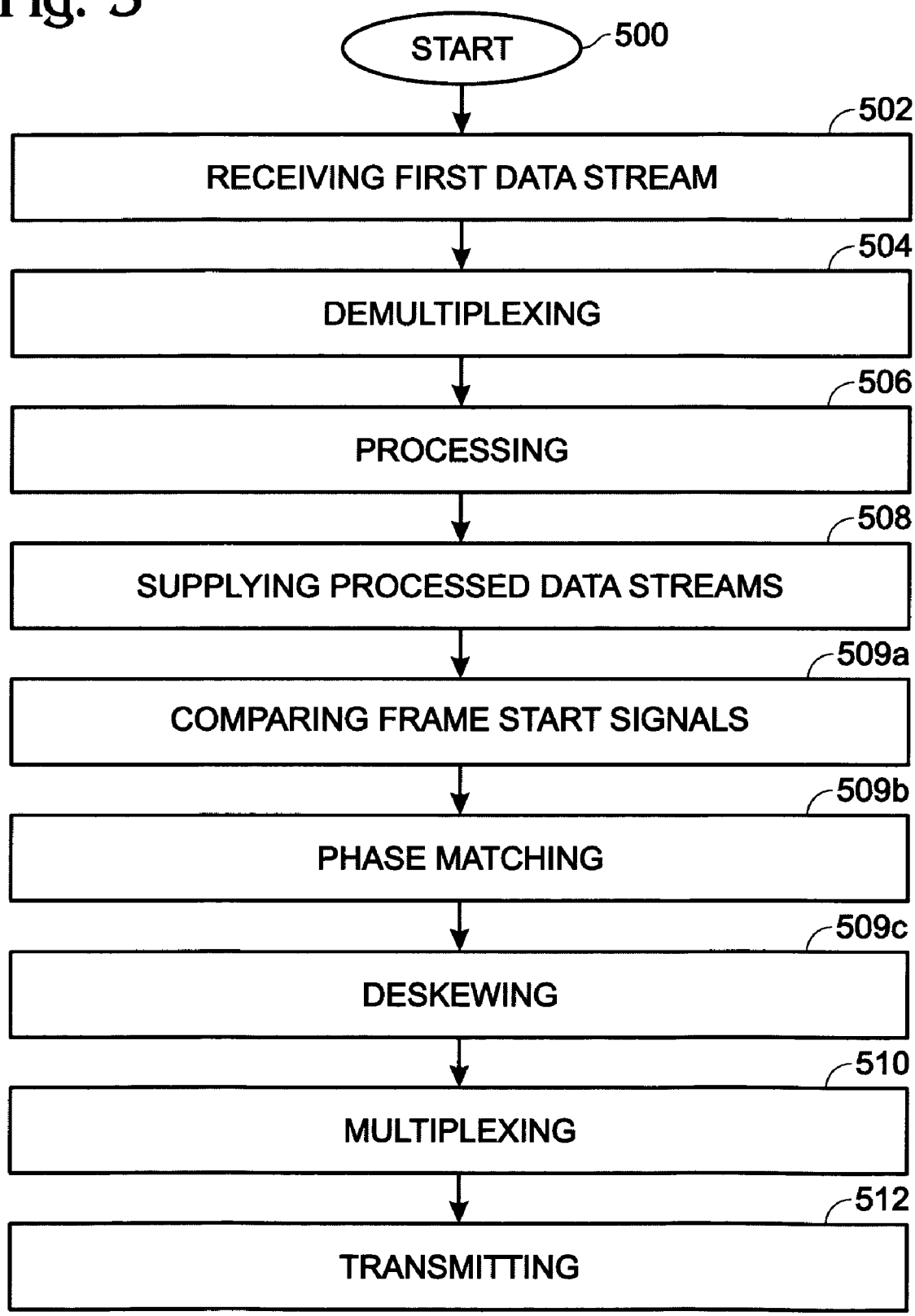
FIG. 5 is a flowchart illustrating the present invention method for paralleling data streams in a G.709 network of connected integrated circuits.

FIG. 5 is a flowchart illustrating the present invention method for paralleling data streams in a G.709 network of connected integrated circuits. Although the method (and the method of FIG. 6 below) is depicted as a sequence of numbered steps for clarity, no order should be inferred from the numbering unless explicitly stated. The method starts at Step 500. Step 502 receives a first digital wrapper data stream having a first data rate. Step 504 demultiplexes the first data stream into a second plurality of digital wrapper data streams having a second data rate, less than the first data rate. In some aspects, demultiplexing the first data stream into a second plurality of digital wrapper data streams includes demultiplexing into four data streams. Step 506 processes the second plurality of data streams at the second data rate. Step 508, following the processing of the second plurality of data streams, supplies a second plurality of processed data streams having the second data rate. Step 510 multiplexes the second plurality of data streams into a first processed data stream having the first data rate. Step 512 transmits the first processed data stream.

In some aspects, receiving a first digital wrapper data stream having a first data rate in Step 502 includes receiving the first data stream at approximately 40-gigabits per second data rate. Demultiplexing the first data stream into a second plurality of digital wrapper data streams having a second data rate, less than the first data rate, in Step 504 includes demultiplexing the approximately 40-gigabits per second data stream into 4 data streams having approximately a 10-gigabits per second rate.

Receiving a first digital wrapper data stream having a first data rate in Step 502 includes receiving messages in a frame format with overhead bytes. Then, demultiplexing the first data stream into a second plurality of digital wrapper data streams having a second data rate in Step 504 includes supplying a second plurality of messages in a frame format with overhead bytes. Further, demultiplexing the first data stream into a second plurality of digital wrapper data streams having a second data rate includes supplying a synchronization signal with each of the second plurality of data streams responsive to overhead bytes in the first data stream. In some aspects of the method, supplying a synchronization signal with each of the second plurality of data streams responsive to overhead bytes in the first data stream in Step 504 includes synchronizing overhead bytes in the second plurality of data streams to overhead bytes in the first data stream. Then, processing the second plurality of data streams at the second rate in Step 506 includes processing each of the second plurality of data streams in response to its corresponding synchronization signal.

In some aspects, receiving messages in a frame format with overhead bytes in Step 502 includes receiving frame alignment signal bytes in the overhead of every frame. Synchronizing overhead bytes in the second plurality of data streams to overhead bytes in the first data stream in Step 504 includes synchronizing frame alignment signal bytes in each of the second plurality of data streams to the frame alignment signal bytes in the first data stream.

In some aspects of the method, supplying a second plurality of processed data streams in Step 508 includes supplying messages in a frame format with overhead bytes. Then, transmitting the first processed data stream in Step 512 includes transmitting messages in a frame format with overhead bytes.

In some aspects, supplying a second plurality of processed data streams in Step 508 includes supplying a frame start signal with each of the second plurality of processed data streams. Then, multiplexing the second plurality of processed data streams into the first processed data stream in Step 510 includes multiplexing in response to the second plurality of frame start signals. Further, multiplexing the second plurality of processed data streams into the first processed data stream includes synchronizing overhead bytes in the first processed data stream to the overhead bytes in the second plurality of processed data streams in response to the frame start signals.

In some aspects of the method, supplying a second plurality of processed data stream messages in a frame format with overhead bytes in Step 508 includes supplying frame alignment signal bytes in the overhead of every frame. Synchronizing overhead bytes in the first processed data stream to overhead bytes in the second plurality of processed data streams in Step 510 includes synchronizing frame alignment signal bytes in the first processed data stream to frame alignment signal bytes in each of the second plurality of processed data streams.

Some aspects of the method included further steps. Step 509*a*, following the supplying of the second plurality of processed data streams, compares each of the second plurality of processed data stream frame start signals. Step 509*b* phase matches the second plurality of frame start signals. Step 509*c* deskews the second plurality of processed data streams to match their corresponding frame start signals (after phase matching). Then, multiplexing the second plurality of processed data streams into the first processed data stream in Step 510 includes multiplexing the deskewed second plurality of processed data streams.

FIG. 6 is a flowchart illustrating an aspect of the present invention method for paralleling data streams of FIG. 5. The method starts at Step 600. Step 602 processes a second plurality of (parallel) data streams at a second rate. Step 604 supplies a second plurality of processed data streams having the second data rate. Step 606 multiplexes the second plurality of processed data streams into a first processed data stream having the first data rate, greater than the second rate. Step 608 transmits the first processed data stream.

A system and method have been provided for paralleling digital wrapper format data streams. Specific examples have been provided in the context of the G.709 standard. In addition, specific data rates and frame structures have been mentioned. However, the present invention is not limited to any particular data rate, multiplexing ratio, or frame structure. Other variations and embodiments of the invention will occur to those skilled in the art.

We claim:
1. In a G.709 network of connected integrated circuits, a method for paralleling data streams, the method comprising:
   receiving a first digital wrapper data stream having a frame format, overhead bytes, and a first data rate;
   demultiplexing the first data stream into a second plurality of digital wrapper data streams having a frame format, overhead bytes, and a second data rate, less than the first data rate, and synchronizing overhead bytes in the second plurality of data streams to overhead bytes in the first data stream;
   processing the second plurality of data streams at the second data rate in response to synchronizing the overhead bytes;
   supplying a second plurality of processed data streams as messages in a frame format having the second data rate, with overhead including a frame start signal and a frame alignment signal bytes;
   comparing each of the second plurality of processed data stream frame start signals;
   phase matching the second plurality of frame start signals;
   deskewing the second plurality of processed data streams to match their corresponding frame start signals;
   multiplexing the deskewed second plurality of data streams into a first processed data stream having the first data rate, by synchronizing frame alignment bytes in the first processed data stream to frame alignment bytes in the second plurality of processed data streams; and,
   transmitting the first processed data stream as messages in a frame format with overhead bytes.

2. The method of claim 1 wherein receiving messages in a frame format with overhead bytes includes receiving frame alignment signal bytes in the overhead of every frame; and,
   wherein synchronizing overhead bytes in the second plurality of data streams to overhead bytes in the first data stream includes synchronizing frame alignment signal bytes in each of the second plurality of data streams to the frame alignment signal bytes in the first data stream.

3. The method of claim 1 wherein demultiplexing the first data stream into a second plurality of digital wrapper data streams includes demultiplexing into four data streams.

4. The method of claim 3 wherein receiving a first digital wrapper data stream having a first data rate includes receiving the first data stream at approximately a 40-gigabits per second data rate; and,
wherein demultiplexing the first data stream into a second plurality of digital wrapper data streams having a second data rate, less than the first data rate, includes demultiplexing the approximately 40-gigabits per second data stream into 4 data streams having approximately a 10-gigabits per second rate.

5. In a G.709 network of connected integrated circuits, a system for paralleling data streams, the system comprising:
a demultiplexer with an input for receiving a first digital wrapper data stream having a frame format, overhead bytes, and a first data rate, the demultiplexer demultiplexing the first data stream into a second plurality of digital wrapper data streams each having a frame format, overhead bytes, and a second data rate, less than the first data rate, supplied at an output, the demultiplexer synchronizing overhead bytes in each of the second plurality of data streams to overhead bytes in the first data stream;
a second plurality of processors, each processor having an input to accept a corresponding one of the second plurality of data streams and an output to supply a processed data stream at the second data rate in a frame format with overhead bytes including a frame start signal and frame alignment signal bytes, wherein each processor has an input to receive a synchronization signal for processing one of the second plurality of data streams in response to the synchronized overhead bytes;
a multiplexer having an input to receive the second plurality of processed data streams, the multiplexer comparing each of the second plurality of received frame start signals, phase matching the frame start signals, deskewing the second plurality of processed data streams to match their corresponding frame start signals, and multiplexing the deskewed second plurality of processed data streams into a first digital wrapper processed data stream having the first data rate and a frame format with overhead bytes, by synchronizing frame alignment bytes in the first processed data stream to frame alignment bytes in the second plurality of processed data streams, the multiplexer supplying first processed data stream at an output for transmission.

6. The system of claim 5 wherein the demultiplexer receives frame alignment signal bytes in the overhead of every first data stream frame and synchronizes frame alignment signal bytes in each of the second plurality of data streams to the frame alignment signal bytes in the first data stream.

7. The system of 5 wherein the second plurality is equal to four.

8. The system of claim 5 wherein the first data rate is approximately 40-gigabits per second (Gbs) and the second data rate is approximately 10-gigabits per second.

* * * * *